United States Patent
Yang et al.

(10) Patent No.: US 11,453,114 B2
(45) Date of Patent: Sep. 27, 2022

(54) FULL-STATE CONTROL METHOD FOR THE MASTER-SLAVE ROBOT SYSTEM WITH FLEXIBLE JOINTS AND TIME-VARYING DELAYS

(71) Applicant: Yanshan University, Qinhuangdao (CN)

(72) Inventors: Yana Yang, Qinhuangdao (CN); Changchun Hua, Qinhuangdao (CN); Junpeng Li, Qinhuangdao (CN); Lu Gan, Qinhuangdao (CN); Yilu Wang, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 47 days.

(21) Appl. No.: 17/145,442

(22) Filed: Jan. 11, 2021

(65) Prior Publication Data
US 2021/0213602 A1 Jul. 15, 2021

(51) Int. Cl.
*B25J 3/00* (2006.01)
*B25J 9/00* (2006.01)

(52) U.S. Cl.
CPC .............. *B25J 3/00* (2013.01); *B25J 9/0084* (2013.01)

(58) Field of Classification Search
CPC ...................................... B25J 3/00; B25J 9/00
See application file for complete search history.

(56) References Cited

U.S. PATENT DOCUMENTS

| | | | |
|---|---|---|---|
| 2006/0290311 A1* | 12/2006 | Chopra | B25J 9/1689 318/568.11 |
| 2012/0245595 A1* | 9/2012 | Kesavadas | B25J 9/1689 606/130 |
| 2019/0176320 A1* | 6/2019 | Smith | F16D 65/18 |
| 2019/0206204 A1* | 7/2019 | Grancharov | G06F 3/016 |
| 2019/0344441 A1* | 11/2019 | Rottmann | B25J 9/1633 |
| 2019/0358817 A1* | 11/2019 | Ghazaei Ardakani | B25J 13/025 |
| 2020/0214779 A1* | 7/2020 | Masuda | B25J 9/1689 |

* cited by examiner

*Primary Examiner* — Kira Nguyen
(74) *Attorney, Agent, or Firm* — Ipro, PLLC; Na Xu

(57) ABSTRACT

A full-state control method for a master-slave robot system with flexible joints and time-varying delays is provided. In a teleoperation system formed by connecting a master robot and a slave robot through network, a proportional damping controller based on a position error and velocities, and a full-state feedback controller based on backstepping are designed for the master robot and the slave robot, respectively. High-dimension uniform accurate differentiators are designed to realize an exact difference to the virtual controllers. Delay-dependent stability criteria are established by constructing Lyapunov functions. Therefore, the criteria for selecting controller parameters are presented such that the global stability of the master-slave robot system with flexible joints and time-varying delays is realized. For the master-slave robot system with flexible joints, the global precise position tracking performance is realized by adopting a full-state feedback controller based on the backstepping method and the high-dimensional uniform accurate differentiators. Moreover, the global asymptotic convergence of the system is guaranteed and the robustness of the system is improved.

6 Claims, 1 Drawing Sheet

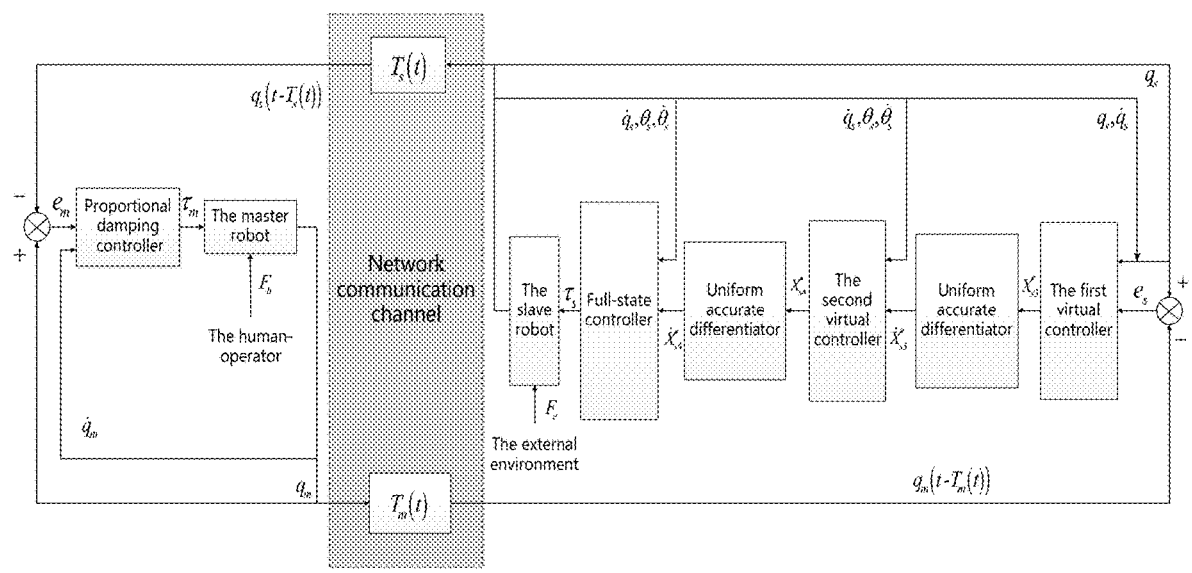

FULL-STATE CONTROL METHOD FOR THE MASTER-SLAVE ROBOT SYSTEM WITH FLEXIBLE JOINTS AND TIME-VARYING DELAYS

TECHNICAL FIELD

This present invention relates to the control field of the flexible master-slave robot system, in particular to a full-state control method for a master-slave robot system with flexible joints and time-varying delays.

BACKGROUND

The master-slave robot system with flexible joints is a very complex dynamic system with high-nonlinearity, strong-coupling, and time-varying delays. To complete some complex and difficult work, flexible joint manipulator has the advantages of small volume, high flexibility, high dead-weight ratio of load, low energy consumption, and wider working space compared with rigid joint manipulators. In most cases, the teleoperation system is a kind of remote operating system to complete more complex operations. It mainly consists of an operator, a master robot system, a network information transmission channel, a slave robot system, and external working environment. Its workflow can be roughly described as follows: the operator manipulates the master robot directly, so the control instructions will be sent to the slave robot through the network information transmission channel, then the slave robot will act on the remote environment according to the instructions. Meanwhile, the relevant information will also be feedback to the operator timely. Therefore, a closed-loop teleoperation system can be constituted and the operating tasks can be completed effectively. For slave robot systems, n-DOF (Degree Of Freedom) robots with flexible joints are usually used to execute commands from the master side.

With the development and progress of science and technology, the exploration of human beings has been constantly expanding. Since flexible joints are characterised by small size and high flexibility, a flexible master-slave robot system is more widely used. However, vibration of the flexible joint may affect the control accuracy and system stability. Therefore, the proposed control method can not only enable the robot to complete the work objectives but also eliminate the vibration of the flexible joint to ensure the stability of the system.

For the master-slave robot system with flexible joints, a full-state feedback control method based on the backstepping technique is proposed. The position error between the master and slave robots with time delays are used to analyze the global tracking performance. The globally accurate position tracking is realized and the robustness of the closed-loop system is improved. The high-dimension uniform accurate differentiators are employed to realize the precise difference to the virtual controllers and the convergence of the system is improved.

SUMMARY

The purpose of the invention is to provide a full-state control method for the master-slave robot system with flexible joints and time-varying delays to solve the problem of position tracking and stability existing in the master-slave robot system with flexible joints. To achieve these above objectives, the following technical schemes are adopted.

A full-state control method for the master-slave robot system with flexible joints and time-varying delays includes the following steps:

Step 1: connecting a master robot and a slave robot through the network to form a teleoperation system.

Step 2: measuring system parameters of the master robot and the slave robot, among which the position and velocity information of joints and motors are measured in real-time.

Step 3: designing the first virtual controller and the second virtual controller, respectively.

The first virtual controller is $X^*_{s3}=X_{s1}+S_s^{-1}(k_s(X_{m1}(t-T_m(t))-X_{s1})-\alpha_s X_{s2})$, the second virtual controller is $$X^*_{s4} = \dot{X}^*_{s3} - 2\frac{k_m}{k_s}S_s^T X_{s2} - k_1(X_{s3} - X^*_{s3}),$$

the subscripts m and s denotes the master robot and the slave robot, respectively, $X^*_{s3}$ and $X^*_{s4}$ are virtual controllers, $\dot{X}^*_{s3}$, is the first derivative of the virtual controller $X^*_{s3}$, $T_m(t)$ and $T_s(t)$ are forward time delay (from the master robot to the slave robot) and feedback time delay (from the slave robot to the master robot), respectively, $\alpha_s$ is a damping coefficient which is a positive constant, $k_m$, $k_s>0$ are proportional coefficients, $S_s^{-1}$ and $S_s^T$ are the inverse matrix and the transpose matrix of a diagonal positive-definite constant matrix $S_s$ which contains the joint stiffness of the slave robot, respectively, and $k_1$ is selected to be a positive constant.

Step 4: designing high-dimension uniform accurate differentiators to carry out a precise difference to the first virtual controller and the second virtual controller.

Step 41:

letting $X_1=X^*_{s3}$, $X_2=\dot{X}^*_{s3}$, $\sigma_1=X_1-Y_1$, $\sigma_2=X_2-Y_2$, $$\begin{cases} \dot{X}_1 = X_2 \\ \dot{X}_2 = \ddot{X}^*_{s3} \end{cases} \quad (1)$$

$$\begin{cases} \dot{Y}_1 = \lambda_1 \frac{\sigma_1}{\|\sigma_1\|^{1/2}} + \lambda_2 \sigma_1 \|\sigma_1\|^{P-1} + Y_2 \\ \dot{Y}_2 = \alpha_1 \frac{\sigma_1}{\|\sigma_1\|} \end{cases} \quad (2)$$

with the Equations (1) and (2), $$\begin{cases} \dot{\sigma}_1 = -\lambda_1 \frac{\sigma_1}{\|\sigma_1\|^{1/2}} - \lambda_2 \sigma_1 \|\sigma_1\|^{P-1} + \sigma_2 \\ \dot{\sigma}_2 = -\alpha_1 \frac{\sigma_1}{\|\sigma_1\|} + \ddot{X}^*_{s3} \end{cases} \quad (3)$$

is derived, where $X^*_{s3}$ denotes the virtual controller, $\dot{X}^*_{s3}$ denotes the first derivative of the virtual controller $X^*_{s3}$, $\ddot{X}^*_{s3}$ denotes the second derivative of the virtual controller $X^*_{s3}$, $Y_1$ is an estimate of the virtual controller $X^*_{s3}$, $Y_2$ is an estimate of $\dot{X}^*_{s3}$, $\sigma_1$ and $\sigma_2$ are estimation errors, $\lambda_1$, $\lambda_2$, $\alpha_1>0$ are system control gains, P>1 is a constant, $\ddot{X}^*_{s3}$ supposed to be bounded and satisfies $\|\ddot{X}^*_{s3}\| \leq L_3$ with a known constant $L_3>0$, and if the parameters are selected to satisfy the conditions $\alpha_1>4L_3$, $\lambda_1>\sqrt{2\alpha_1}$, the estimation errors $\sigma_1$, $\sigma_2$ will globally converge to the origin quickly, thus a precise difference value $\dot{X}^*_{s3}$ of $X^*_{s3}$ is obtained.

Step 42:

letting $X_3=X^*_{s4}$, $X_4=\dot{X}^*_{s4}$, $\sigma_3=X_3-Y_3$, $\sigma_{z_1}=X_4-Y_4$ $$\begin{cases} \dot{X}_3 = X_4 \\ \dot{X}_3 = \ddot{X}_{s4}^* \end{cases} \quad (4)$$

$$\begin{cases} \dot{Y}_3 = \lambda_3 \dfrac{\sigma_3}{\|\sigma_3\|^{1/2}} + \lambda_4 \sigma_3 \|\sigma_3\|^{P-1} + Y_4 \\ \dot{Y}_4 = \alpha_2 \dfrac{\sigma_3}{\|\sigma_3\|} \end{cases} \quad (5)$$

with the Equations (4) and (5), $$\begin{cases} \dot{\sigma}_3 = -\lambda_3 \dfrac{\sigma_3}{\|\sigma_3\|^{1/2}} - \lambda_4 \sigma_3 \|\sigma_3\|^{P-1} + \sigma_4 \\ \dot{\sigma}_4 = -\alpha_2 \dfrac{\sigma_3}{\|\sigma_3\|} + \ddot{X}_{s4}^* \end{cases} \quad (6)$$

is derived, where $X^*_{s4}$ denotes a virtual controller, $\dot{X}^*_{s4}$ denotes the first derivative of the virtual controller $X^*_{s4}$, $\ddot{X}^*_{s4}$ denotes the second derivative of the virtual controller $X^*_{s4}$, $Y_3$ is an estimate of the virtual controller $X^*_{s4}$, $Y_4$ is an estimate of $\dot{X}^*_{s4}$, $\sigma_3$ and $\sigma_4$ are estimation errors, $\lambda_3$, $\lambda_4$, $\alpha_2 > 0$ are system control gains, $P > 1$ is a constant, $\ddot{X}^*_{s4}$ is supposed to be bounded $\|\ddot{X}^*_{s4}\| \leq L_4$ with a known positive constant $L_4 > 0$, and if parameters are selected to satisfy the conditions $\alpha_2 > 4L_4$, $\lambda_3 > \sqrt{2\alpha_2}$, the estimation errors $\sigma_3$, $\sigma_4$ will globally converge to the origin quickly, thus a precise difference value $\dot{X}^*_{s4}$ of $X^*_{s4}$ is obtained.

Step 5: designing the controllers of the master-slave robot system with flexible joints by using the backstepping method as follows $$\tau_m = -k_m(X_{m1} - X_{s1}(t - T_s(t))) - \alpha_m X_{m2}$$

$$\tau_s = S_s(X_{s3} - X_{s1}) + J_s(\dot{X}_{s4}^* - (X_{s3} - X_{s3}^*)) - k_2(X_{s4} - X_{s4}^*)$$

$$X_{s3}^* = X_{s1} + S_s^{-1}(k_s(X_{m1}(t - T_m(t)) - X_{s1}) - \alpha_s X_{s2})$$

$$X_{s4}^* = \dot{X}_{s3}^* - 2\dfrac{k_m}{k_s}S_s^T X_{s2} - k_1(X_{s3} - X_{s3}^*)$$

where $\tau_m$ and $\tau_s$ are control torques provided by the controllers, $X^*_{s3}$ and $X^*_{s4}$ are virtual controllers, $\dot{X}^*_{s3}$ and $\dot{X}^*_{s4}$ are the first derivatives of the virtual controllers $X^*_{s3}$ and $X^*_{s4}$, respectively, $T_m(t)$ and $T_s(t)$ are forward time delay (from the master robot to the slave robot) and backward time delay (from the slave robot to the master robot), respectively, $\alpha_m$ and $\alpha_s$ are damping coefficients which are positive constants, $k_m$, $k_s > 0$ are proportional coefficients, $S_s^{-1}$ and $S_s^T$ are the inverse matrix and the transpose matrix of a diagonal positive-definite constant matrix $S_s$ which contains the joint stiffness of the slave robot, respectively, $J_s$ is a diagonal constant matrix of the moment of actuator interia, and $k_1$ and $k_2$ are selected to be positive constants.

Step 6: establishing the delay-dependent system stability criteria by constructing Lyapunov Equations, providing the criteria for selecting controller parameters, and realizing the global stability of the master-slave robot system with flexible joints and time-varying delays.

When the controller parameters are selected such that the following inequalities hold, $$-2\alpha_m I + \overline{T}_m Z + \overline{T}_s k_m^2 P^{-1} < 0, \quad -2\dfrac{k_m \alpha_s}{k_s}I + \overline{T}_s P + \overline{T}_m k_m^2 Z^{-1} < 0$$

the joint and motor velocities $\dot{q}_m$, $\dot{q}_s$, $\dot{\theta}_s$ and position error $q_m - q_s$ of the master-slave robot system with flexible joints are all bounded.

Furthermore, when a force $F_h$ exerted by an operator to the master robot and a force $F_e$ exerted by the external environment to the slave robot are both zero, the controllers are designed as follows:

$$\tau_m = -k_m(X_{m1} - X_{s1}(t - T_s(t))) - \alpha_m X_{m2} + G_m(X_{m1}) \quad (7)$$

$$\tau_s = S_s(X_{s3} - X_{s1}) + J_s(\dot{X}_{s4}^* - (X_{s3} - X_{s3}^*)) - k_2(X_{s4} - X_{s4}^*)$$

$$X_{s3}^* = X_{s1} + S_s^{-1}(k_s(X_{m1}(t - T_m(t)) - X_{s1}) - \alpha_s X_{s2} + G_s(X_{s1}))$$

$$X_{s4}^* = \dot{X}_{s3}^* - 2\dfrac{k_m}{k_s}S_s^T X_{s2} - k_1(X_{s3} - X_{s3}^*)$$

where $\tau_m$ and $\tau_s$ are control torques provided by the controllers, $X^*_{s3}$ and $X^*_{s4}$ are virtual controllers, $\dot{X}^*_{s3}$ and $\dot{X}^*_{s4}$ are the first derivatives of the virtual controllers $X^*_{s3}$ and $X^*_{s4}$, respectively, $T_m(t)$ and $T_s(t)$ are forward time delay (from the master robot to the slave robot) and backward time delay (from the slave robot to the master robot), respectively, $\alpha_m$ and $\alpha_s$ are damping coefficients which are positive constants, $k_m$, $k_s > 0$ are proportional coefficients, $S_s^{-1}$ and $S_s^T$ are the inverse matrix and the transpose matrix of a diagonal positive-definite constant matrix $S_s$ which contains the joint stiffness of the slave robot, respectively, $G_m(X_{m1})$, $G_s(X_{s1})$ are the gravitational torques of the master robot and the slave robot, $J_s$ is a diagonal constant matrix of the moment of actuator inertia, and $k_1$ and $k_2$ are selected to be positive constants.

When the controller parameters are selected such that the following inequalities hold, $$-2\alpha_m I + \overline{T}_m Z + \overline{T}_s k_m^2 P^{-1} < 0, \quad -2\dfrac{k_m \alpha_s}{k_s}I + \overline{T}_s P + \overline{T}_m k_m^2 Z^{-1} < 0$$

it can be guaranteed that the joint and motor velocities $\dot{q}_m$, $\dot{q}_s$, $\dot{\theta}_s$ and the position error $q_m - q_s$ of the master-slave robot system with flexible joints will converge to zero asymptotically and that the global master-slave robot system with flexible joints will asymptotically become stable, where I is the identity matrix, $Z^{-1}$ and $P^{-1}$ are the inverse matrices of positive definite matrices Z and P, respectively, $\alpha_m$ and $\alpha_s$ are damping coefficients which are positive constants, $k_m$, $k_s > 0$ are proportional coefficients, and it is supposed that the time delay $T_m(t)$ and $T_s(t)$ are bounded, i.e. there are positive scalars $\overline{T}_m$ and $\overline{T}_s$, such that the inequalities $T_m(t) \leq \overline{T}_m$, $T_s(t) \leq \overline{T}_s$ hold.

Preferably, the system parameters of the master robot and the slave robot include the length and the mass of the robot manipulators of the master robot and the slave robot, the positions and the velocities of the robot joints and motor of the master robot and the slave robot, and the force exerted by the operator and the force exerted by the external environment measured by using force sensors.

Preferably, the design process of the first virtual controller and the second virtual controller is as follows:

As for the first virtual controller, the first Lyapunov Equation is selected as follows, $$V_1 = V_{11} + V_{12} + V_{13} \quad (8)$$

-continued
$$V_{11} = X_{m2}^T M_m(X_{m1})X_{m2} + \frac{k_m}{k_s} X_{s2}^T M_s(X_{s1})X_{s2} + 2(U_m(X_{m1}) - \beta_m) +$$
$$\frac{2k_m}{k_s}(U_s(X_{s1}) - \beta_s) + 2\int_0^t \left(-X_{m2}^T(\sigma)F_h(\sigma) + \frac{k_m}{k_s} X_{s2}^T(\sigma)F_e(\sigma)\right)d\sigma$$

$$V_{12} = k_m(X_{m1} - X_{s1})^T(X_{m1} - X_{s1})$$

$$V_{13} = \int_{-T_m}^0 \int_{t+\theta}^t X_{m2}^T(\xi)ZX_{m2}(\xi)d\xi d\theta + \int_{-T_s}^0 \int_{t+\theta}^t X_{s2}^T(\xi)PX_{s2}(\xi)d\xi d\theta$$

where the integral terms satisfy $\int_0^t -X_{m2}^T(\sigma)F_h(\sigma)d\sigma \geq 0$, $\int_0^t X_{s2}^T(\sigma)F_e(\sigma)d\sigma \geq 0$, Z and P are positive definite matrices, it is supposed that the time delay $T_m(t)$ and $T_s(t)$ are bounded, i.e. there are positive scalars $\overline{T}_m$ and $\overline{T}_s$, such that $T_m(t) \leq \overline{T}_m$, $T_s(t) \leq \overline{T}_s$, $M_m(X_{m1})$ and $M_s(X_{s1})$ are the positive-definite inertia matrices of the master robot and the slave robot, respectively, $U_m(X_{m1})$ and $U_s(X_{s1})$ are the potential energy of the master robot and the slave robot satisfying $$G_m(X_{m1}) = \frac{\partial U_m(X_{m1})}{\partial X_{m1}}, \quad G_s(X_{s1}) = \frac{\partial U_s(X_{s1})}{\partial X_{s1}},$$

there are positive scalars $\beta_m$ and $\beta_s$ such that $U_m(X_{m1}) \geq \beta_m$, $U_s(X_{s1}) \geq \beta_s$, and $k_m$, $k_s > 0$ are the proportional coefficients.

The time derivative of $V_{11}$ is given by $$\dot{V}_{11} = -2k_m X_{m2}^T(X_{m1} - X_{s1}(t - T_s(t))) - \quad (9)$$
$$2\alpha_m X_{m2}^T X_{m2} + 2\frac{k_m}{k_s} X_{s2}^T S_s(X_{s3} - X_{s1})$$
$$= -2k_m X_{m2}^T(X_{m1} - X_{s1}(t - T_s(t))) - 2\alpha_m X_{m2}^T X_{m2} +$$
$$2\frac{k_m}{k_s} X_{s2}^T(S_s(X_{s3} - X_{s3}^*) + S_s X_{s3}^* - S_s X_{s1})$$

where $S_s$ is a diagonal positive-definite constant matrix which contains the joint stiffness of the slave robot, $S_s^{-1}$ is the inverse matrix of $S_s$.

With Equation (9), the first virtual controller $X^*_{s3} = X_{s1} + S_s^{-1}(k_s(X_{m1}(t - T_m(t)) - X_{s1}) - \alpha_s X_{s2})$ is derived.

As for the second virtual controller, the second Lyapunov equation is selected as follows, $$V_2 = V_1 + \tfrac{1}{2}(X_{s3} - X^*_{s3})^T(X_{s3} - X^*_{s3}) \quad (10)$$

The time derivative of $V_2$ is given by $$\dot{V}_2 = \dot{V}_1 + (X_{s3} - X^*_{s3})^T(\dot{X}_{s3} - \dot{X}^*_{s3}) = \dot{V}_1 + (X_{s3} - X^*_{s3})^T(X_{s4} - X^*_{s4} + X^*_{s4} - \dot{X}^*_{s3}) \quad (11)$$

With Equation (11), the second virtual controller $$X^*_{s4} = \dot{X}^*_{s3} - 2\frac{k_m}{k_s} S_s^T X_{s2} - k_1(X_{s3} - X^*_{s3})$$

is derived.

Preferably, a high-dimensional uniform accurate differentiators is designed as follows.

Letting $X_1 = X^*_{s3}$, $X_2 = \dot{X}^*_{s3}$, $\sigma_1 = X_1 - Y_1$, $\sigma_2 = X_2 - Y_2$, $$\begin{cases} \dot{X}_1 = X_2 \\ \dot{X}_2 = \ddot{X}^*_{s3} \end{cases} \quad (12)$$

$$\begin{cases} \dot{Y}_1 = \lambda_1 \frac{\sigma_1}{\|\sigma_1\|^{1/2}} + \lambda_2 \sigma_1 \|\sigma_1\|^{P-1} + Y_2 \\ \dot{Y}_2 = \alpha_1 \frac{\sigma_1}{\|\sigma_1\|} \end{cases} \quad (13)$$

With Equations (12) and (13), $$\begin{cases} \dot{\sigma}_1 = -\lambda_1 \frac{\sigma_1}{\|\sigma_1\|^{1/2}} - \lambda_2 \sigma_1 \|\sigma_1\|^{P-1} + \sigma_2 \\ \dot{\sigma}_2 = -\alpha_1 \frac{\sigma_1}{\|\sigma_1\|} + \ddot{X}^*_{s3} \end{cases} \quad (14)$$

is derived, where $X^*_{s3}$ denotes the virtual controller, $\dot{X}^*_{s3}$ denotes the first derivative of the virtual controller $X^*_{s3}$, $\ddot{X}^*_{s3}$ denotes the second derivative of the virtual controller $X^*_{s3}$, $Y_1$ is an estimate of the virtual controller $X^*_{s3}$, $Y_2$ is an estimate of $\dot{X}^*_3$, $\sigma_1$ and $\sigma_2$ are estimation errors, $\lambda_1$, $\lambda_2$, $\alpha_1 > 0$ are system control gains, $P > 1$ is a constant, $\ddot{X}^*_{s3}$ is supposed to be bounded and satisfies $\|\ddot{X}^*_{s3}\| \leq L_3$ with a known constant $L_3 > 0$, and if the parameters are selected to satisfy the conditions $\alpha_1 > 4L_3$, $\lambda_1 > \sqrt{2\alpha_1}$, the estimation errors $\sigma_1$, $\sigma_2$ will globally converge to the origin quickly, thus a precise difference value $\dot{X}^*_{s3}$ of $X^*_{s3}$ is obtained.

Letting $X_3 = X^*_{s4}$, $X_4 = \dot{X}^*_{s4}$, $\sigma_3 = X_3 - Y_3$, $\sigma_4 = X_4 - Y_4$, $$\begin{cases} \dot{X}_3 = X_4 \\ \dot{X}_4 = \ddot{X}^*_{s4} \end{cases} \quad (15)$$

$$\begin{cases} \dot{Y}_3 = \lambda_3 \frac{\sigma_3}{\|\sigma_3\|^{1/2}} + \lambda_4 \sigma_3 \|\sigma_3\|^{P-1} + Y_4 \\ \dot{Y}_4 = \alpha_2 \frac{\sigma_3}{\|\sigma_3\|} \end{cases} \quad (16)$$

With Equations (15) and (16), $$\begin{cases} \dot{\sigma}_3 = -\lambda_3 \frac{\sigma_3}{\|\sigma_3\|^{1/2}} - \lambda_4 \sigma_3 \|\sigma_3\|^{P-1} + \sigma_4 \\ \dot{\sigma}_4 = -\alpha_2 \frac{\sigma_3}{\|\sigma_3\|} + \ddot{X}^*_{s4} \end{cases} \quad (17)$$

is derived, where $X^*_{s4}$ denotes a virtual controller, $\dot{X}^*_{s4}$ is the first derivative of the virtual controller $X^*_{s4}$, $\ddot{X}^*_{s4}$ is the second derivative of the virtual controller $X^*_{s4}$, $Y_3$ is an estimate of the virtual controller $X^*_{s4}$, $Y_4$ is an estimate of $\dot{X}^*_{s4}$, $\sigma_3$ and $\sigma_4$ are estimation errors, $\lambda_3$, $\lambda_4$, $\alpha_2 > 0$ are system control gains, $\ddot{X}^*_{s4}$ supposed to be bounded and satisfies $\|\ddot{X}^*_{s4}\| \leq L_4$ with a known positive is constant $L_4 > 0$, and, if the parameters are selected to satisfy the conditions $\alpha_2 > 4L_4$, $\lambda_3 > \sqrt{2\alpha_2}$, the estimation errors $\sigma_3$, $\sigma_4$ will globally converge to the origin quickly, thus a precise difference value $\dot{X}^*_{s4}$ of $X^*_{s4}$ is obtained.

Preferably, a delay-dependent system stability criteria is established by constructing the Lyapunov Equations, thus a criteria for selecting controller parameters are provided. The detailed steps are as follows.

S1 selecting the first Lyapunov Equation as follows, $$V_1 = V_{11} + V_{12} + V_{13} \quad (18)$$

$$V_{11} = X_{m2}^T M_m(X_{m1})X_{m2} + \frac{k_m}{k_s} X_{s2}^T M_s(X_{s1})X_{s2} + 2(U_m(X_{m1}) - \beta_m) +$$

-continued $$\frac{2k_m}{k_s}(U_s(X_{s1})-\beta_s)+2\int_0^t\left(-X_{m2}^T(\sigma)F_h(\sigma)+\frac{k_m}{k_s}X_{s2}^T(\sigma)F_e(\sigma)\right)d\sigma$$

$$V_{12}=k_m(X_{m1}-X_{s1})^T(X_{m1}-X_{s1})$$

$$V_{13}=\int_{-\overline{T}_m}^0\int_{t+\theta}^t X_{m2}^T(\xi)ZX_{m2}(\xi)d\xi d\theta+\int_{-\overline{T}_s}^0\int_{t+\theta}^t X_{s2}^T(\xi)PX_{s2}(\xi)d\xi d\theta$$

where the integral terms satisfy $\int_0^t-X_{m2}^T(\sigma)F_h(\sigma)d\sigma\geq 0$, $\int_0^t X_{s2}^T(\sigma)F_e(\sigma)d\sigma\geq 0$, Z and P are positive definite matrices, it is supposed that the time delay $T_m(t)$ and $T_s(t)$ are bounded, i.e. there are positive scalars $\overline{T}_m$ and $\overline{T}_s$, such that $T_m(t)\leq \overline{T}_m$, $T_s(t)\leq \overline{T}_s$, $M_m(X_{m1})$ and $M_s(X_{s1})$ are the positive-definite inertia matrices of the master robot and the slave robot, respectively, $U_m(X_{m1})$ and $U_s(X_{s1})$ are the potential energy of the master robot and the slave robot satisfying $$G_m(X_{m1})=\frac{\partial U_m(X_{m1})}{\partial X_{m1}},\ G_s(X_{s1})=\frac{\partial U_s(X_{s1})}{\partial X_{s1}},$$

there are positive scalars $\beta_m$ and $\beta_s$ such that $U_m(X_{m1})\leq \beta_m$, $U_s(X_{s1})\geq \beta_s$, and $k_m$, $k_s>0$ are proportional coefficients.

The time derivative of $V_1$ is given by $$\dot{V}_1=\dot{V}_{11}+\dot{V}_{12}+\dot{V}_{13}\leq X_{m2}^T(-2\alpha_m I+\overline{T}_m Z+\overline{T}_s k_m^2 P^{-1})X_{m2}+ \quad (19)$$

$$X_{s2}^T\left(-2\frac{k_m\alpha_s}{k_s}I+\overline{T}_s P+\overline{T}_m k_m^2 Z^{-1}\right)X_{s2}+2\frac{k_m}{k_s}X_{s2}^T S_s(X_{s3}-X_{s3}^*)$$

where I is the identity matrix, $Z^{-1}$ and $P^{-1}$ are the inverse matrices of positive definite matrices Z and P, respectively, $S_s$ is a diagonal positive-definite constant matrix which contains the joint stiffness of the slave robot, $\alpha_m$ and $\alpha_s$ are damping coefficients which are positive constants, $k_m$, $k_s>0$ are proportional coefficients, it is supposed that the time delay $T_m(t)$ and $T_s(t)$ are bounded, i.e. there are positive scalars $\overline{T}_m$ and $\overline{T}_s$, such that $T_m(t)\leq \overline{T}_m$, $T_s(t)\leq \overline{T}_s$, and $X^*_{s3}$ is the first virtual controller.

S2 selecting the second Lyapunov Equation as follows:

$$V_2=V_1+\tfrac{1}{2}(X_{s3}-X^*_{s3})^T(X_{s3}-X^*_{s3}) \quad (20)$$

The time derivative of $V_2$ is given by $$\dot{V}_2\leq X_{m2}^T(-2\alpha_m I+\overline{T}_m Z+\overline{T}_s k_m^2 P^{-1})X_{m2}+ \quad (21)$$

$$X_{s2}^T\left(-2\frac{k_m\alpha_s}{k_s}I+\overline{T}_s P+\overline{T}_m k_m^2 Z^{-1}\right)X_{s2}+$$

$$(X_{s3}-X^*_{s3})^T(X_{s4}-X^*_{s4})-k_1(X_{s3}-X^*_{s3})^T(X_{s3}-X^*_{s3})$$

S3 selecting the third Lyapunov Equation as follows:

$$V_3=V_2+\tfrac{1}{2}(X_{s4}-X^*_{s4})^T(X_{s4}-X^*_{s4}) \quad (22)$$

The time derivative of $V_3$ is given by $$\dot{V}_3\leq X_{m2}^T(-2\alpha_m I+\overline{T}_m Z+\overline{T}_s k_m^2 P^{-1})X_{m2}+ \quad (23)$$

$$X_{s2}^T\left(-2\frac{k_m\alpha_s}{k_s}I+\overline{T}_s P+\overline{T}_m k_m^2 Z^{-1}\right)X_{s2}-$$

$$k_1(X_{s3}-X^*_{s3})^T(X_{s3}-X^*_{s3})-k_2(X_{s4}-X^*_{s4})^T(X_{s4}-X^*_{s4})$$

When the controller parameters are selected such that the following inequalities hold, $$-2\alpha_m I+T_m Z+T_s k_m^2 P^{-1}<0,\ -2\frac{k_m\alpha_s}{k_s}I+T_s P+T_m k_m^2 Z^{-1}<0$$

the joint and motor velocities $\dot{q}_m$, $\dot{q}_s$, $\dot{\theta}_s$ and the position error $q_m-q_s$ of the master-slave robot system with flexible joints are all bounded.

When a force $F_h$ exerted by an operator to the master robot and a force $F_e$ exerted by the external environment to the slave robot are both zero, the controllers are designed as follows:

$$\tau_m=-k_m(X_{m1}-X_{s1}(t-T_s(t)))-\alpha_m X_{m2}+G_m(X_{m1}) \quad (24)$$

$$\tau_s=S_s(X_{s3}-X_{s1})+J_s\left(\dot{X}^*_{s4}-(X_{s3}-X^*_{s3})-k_2(X_{s4}-X^*_{s4})\right)$$

$$X^*_{s3}=X_{s1}+S_s^{-1}(k_s(X_{m1}(t-T_m(t))-X_{s1})-\alpha_s X_{s2}+G_s(X_{s1}))$$

$$X^*_{s4}=\dot{X}^*_{s3}-2\frac{k_m}{k_s}S_s^T X_{s2}-k_1(X_{s3}-X^*_{s3})$$

where $\tau_m$ and $\tau_s$ are control torques provided by the controllers, $X^*_{s3}$ and $X^*_{s4}$ are virtual controllers, $\dot{X}^*_{s3}$ and $\dot{X}^*_{s4}$ are the first derivatives of the virtual controllers $X^*_{s3}$ and $X^*_{s4}$, respectively, $T_m(t)$ and $T_s(t)$ are forward time delay (from the master robot to the slave robot) and feedback time delay (from the slave robot to the master robot), respectively, $\alpha_m$ and $\alpha_s$ are damping coefficients which are positive constants, $k_m$, $k_s>0$ are proportional coefficients, $S_s^{-1}$ and $S_s^T$ are the inverse matrix and the transpose matrix of a diagonal positive-definite constant matrix $S_s$ which contains the joint stiffness of the slave robot, respectively, $G_m(X_{m1})$, $G_s(X_{s1})$ are the gravitational torques of the master robot and the slave robot, respectively, and $k_1$ and $k_2$ are selected to be positive constants.

When the controller parameters $\alpha_m$, $\alpha_s$, $k_m$, $k_s$, I, $T_m$, $T_s$, Z, P are selected such that the following conditions hold, $$-2\alpha_m I+T_m Z+T_s k_m^2 P^{-1}<0,\ -2\frac{k_m\alpha_s}{k_s}I+T_s P+T_m k_m^2 Z^{-1}<0$$

it is guaranteed that the joint and motor velocities $\dot{q}_m$, $\dot{q}_s$, $\dot{\theta}_s$ and the position error $q_m-q_s$ of the master-slave robot system with flexible joints will converge to zero asymptotically and that the global master-slave robot system with flexible joints will asymptotically become stable.

Compared with the existing methods, the present invention has the following advantages:

1. Compared with the local state control method, the proposed full-state control method can realize the global asymptotic stability of the master-slave system better.

2. The exact position tracking accuracy can be guaranteed by applying the full-state feedback controller based on the backstepping method globally and the robustness of closed-loop system also can be improved.

3. The precise difference to the virtual controllers can be realized by designing high-dimension uniform accurate differentiators. Additionally, this method is more applicable to the high-order control systems.

BRIEF DESCRIPTION OF THE DRAWINGS

FIG. 1 is a schematic control block diagram of the present invention.

DETAILED DESCRIPTION

The invention is further explained in combination with the attached FIGURE as follows.

As shown in FIG. 1, the steps of the invention method are as follows:

Step 1: connecting the master robot and the slave robot through the network to form a teleoperation system, measuring the system parameters of the master robot and the slave robot, and measuring a force exerted by an operator and a force exerted by the external environment by using force sensors.

The system parameters of the master robot and the slave robot includes the length and the mass of the manipulators, the positions and the positive-definite inertia matrices $M_m(X_{m1})$ and $M_s(X_{s1})$, the matrices of centripetal and coriolis torques $C_m(q_m, \dot{q}_m)$ and $C_s(q_s, \dot{q}_s)$, the gravity torques $G_m(X_{m1})$ and $G_s(X_{s1})$, the diagonal constant matrix $J_s$ of the moment of actuator inertia of the master robot and the slave robot, and a diagonal positive-definite constant matrix $S_s$ that contains the joint stiffness of the slave robot respectively according to the length and the mass of the manipulators. Moreover, a force $F_h$ exerted by the operator to the master robot and a force $F_e$ exerted by the external environment to the slave robot are measured by using force sensors.

The system dynamics equation can be described as $$M_m(q_m)\ddot{q}_m + C_m(q_m,\dot{q}_m)\dot{q}_m + G_m(q_m) = \tau_m + F_h$$

$$M_s(q_s)\ddot{q}_s + C_s(q_s,\dot{q}_s)\dot{q}_s + G_s(q_s) = S_s(\theta_s - q_s) - F_e$$

$$J_s\ddot{\theta}_s + S_s(\theta_s - q_s) = \tau_s \qquad (1)$$

where the subscripts m and s denotes the master robot and the slave robot, respectively. $q_m$, $q_s \in R^n$ are the vectors of joint displacements. $\dot{q}_m$, $\dot{q}_s \in R^n$ are the vectors of joint velocities. $\ddot{q}_m$, $\ddot{q}_s \in R^n$ are the vectors of joint accelerations. $\theta_s \in R^n$ is the vector of motor displacements, $\ddot{\theta}_s \in R^n$ is the vector of motor accelerations. $M_m(q_m)$, $M_s(q_s) \in R^{n \times n}$ are the positive-definite inertia matrices of the system, $C_m(q_m, \dot{q}_m)$, $C_s(q_s, \dot{q}_s) \in R^n$ are the matrices of centripetal and coriolis torques, $G_m(q_m)$, $G_s(q_s) \in R^n$ are the gravitational torques. $J_s \in R^{n \times n}$ is the diagonal constant matrix of the moments of actuator inertia. $S_s \in R^n$ is a diagonal positive-definite constant matrix that contains the joint stiffness of the slave robot. $F_h$, $F_e \in R^n$ are the force exerted by the operator to the master robot and the force exerted by the external environment to the slave robot, respectively. $\tau_m$, $\tau_s \in R^n$ are control torques provided by the controllers.

Step 2: measuring the position and velocity information of joints and motors in real-time, designing a proportional damping controller for the master robot based on position error and velocities, and designing a full-state feedback controller for the slave robot based on backstepping recursive technology in combination with Lyapunov equation.

For the master robot with rigid joints, letting $X_{m1} = q_m$, $X_{m2} = \dot{q}_m$, the state space expression of the system is obtained as follows:

$$\begin{cases} \dot{X}_{m1} = X_{m2} \\ \dot{X}_{m2} = M_m^{-1}(X_{m1})(\tau_m + F_h - C_m(X_{m1}, X_{m2})X_{m2} - G_m(X_{m1})) \end{cases} \qquad (2)$$

where the subscripts m denotes the master robot, $q_m \in R^n$ is the vector of joint displacements, $\dot{q}_m \in R^n$ is the vector of joint velocities, $M_m^{-1}(X_{m1})$ is the inverse matrix of the positive-definite inertia matrix $M_m(X_{m1})$, $\tau_m \in R^n$ is a control torque provided by the controller, $C_m(q_m, \dot{q}_m) \in R^n$ is the matrix of centripetal and coriolis torque, $G_m(q_m) \in R^n$ is the gravitational torque, and $F_h \in R^n$ is a force exerted by an operator to the master robot.

For the slave robot with flexible joints, letting $X_{s1} = q_s$, $X_{s2} = \dot{q}_s$, $X_{s3} = \theta_s$, $X_{s4} = \dot{\theta}_s$, the state space expression of the system is obtained as follows:

$$\begin{cases} \dot{X}_{s1} = X_{s2} \\ \dot{X}_{s2} = M_s^{-1}(X_{s1})(S_s(X_{s3} - X_{s1}) - F_e - C_s(X_{s1}, X_{s2})X_{s2} - G_s(X_{s1})) \\ \dot{X}_{s3} = X_{s4} \\ \dot{X}_{s4} = J_s^{-1}(\tau_s - S_s(X_{s3} - X_{s1})) \end{cases} \qquad (3)$$

where the subscripts s denotes the master robot, $q_s \in R^n$ is the vector of joint displacements, $\dot{q}_s \in R^n$ is the vector of joint velocities, $\theta_s \in R^n$ is the vector of motor displacements, $\dot{\theta}_s \in R^n$ is the vector of motor velocities. $M_s^{-1}(X_{s1})$ is the inverse matrix of the positive-definite inertia matrix $M_s(X_{s1})$, $J_s^{-1}$ is the inverse matrix of the diagonal constant matrix $J_s$ of the moments of actuator interia, $\tau_s \in R^n$ is the control torque of the controller, $C_s(q_s, \dot{q}_s) \in R^n$ is the matrix of centripetal and coriolis torque, $G_s(q_s) \in R^n$ is the gravitational torque, $F_e$ is a force exerted by the external environment to the slave robot, and, $S_s \in R^{n \times n}$ is a diagonal positive-definite constant matrix that contains the joint stiffness of the slave robot.

The first Lyapunov Equation is selected as follows, $$V_1 = V_{11} + V_{12} + V_{13} \qquad (4)$$

$$V_{11} = X_{m2}^T M_m(X_{m1})X_{m2} + \frac{k_m}{k_s}X_{s2}^T M_s(X_{s1})X_{s2} + 2(U_m(X_{m1}) - \beta_m) +$$

$$\frac{2k_m}{k_s}(U_s(X_{s1}) - \beta_s) + 2\int_0^t \left(-X_{m2}^T(\sigma)F_h(\sigma) + \frac{k_m}{k_s}X_{s2}^T(\sigma)F_e(\sigma)\right)d\sigma$$

$$V_{12} = k_m(X_{m1} - X_{s1})^T(X_{m1} - X_{s1})$$

$$V_{13} = \int_{-T_m}^0 \int_{t+\theta}^t X_{m2}^T(\xi)ZX_{m2}(\xi)d\xi d\theta + \int_{-T_s}^0 \int_{t+\theta}^t X_{s2}^T(\xi)PX_{s2}(\xi)d\xi d\theta$$

where the integral terms satisfy $\int_0^t -X_{m2}^T(\sigma)F_h(\sigma)d\sigma \geq 0$, $\int_0^t X_{s2}^T(\sigma)F_e(\sigma)d\sigma \geq 0$. Z and P are positive definite matrices. It is supposed that the time delay $T_m(t)$ and $T_s(t)$ are bounded, i.e. there are positive scalars $\overline{T}_m$ and $\overline{T}_s$, such that $T_m(t) \leq \overline{T}_m$, $T_s(t) \leq \overline{T}_s$. $M_m(M_{m1})$ and $M_s(X_{s1})$ are positive-definite inertia matrices of the master robot and the slave robot, respectively.

$U_m(X_{m1})$ and $U_s(X_{s1})$ are the potential energy of the master robot and the slave robot satisfying $$G_m(X_{m1}) = \frac{\partial U_m(X_{m1})}{\partial X_{m1}}, \quad G_s(X_{s1}) = \frac{\partial U_s(X_{s1})}{\partial X_{s1}}.$$

There are positive scalars $\beta_m$ and $\beta_s$ such that $U_m(X_{m1}) \geq \beta_m$, $U_s(X_{s1}) \geq \beta_s$, and $k_m$, $k_s > 0$ are proportional coefficients.

The time derivatives of $V_1$, $V_{11}$, $V_{12}$, $V_{13}$ are given by $$\dot{V}_{11} = 2X_{m2}^T(F_h - k_m(X_{m1} - X_{s1}(t - T_s(t))) - \alpha_m X_{m2} - C_m(X_{m1}, X_{m2})X_{m2} - G_m(X_{m1})) \quad (5)$$

$$+ 2\frac{k_m}{k_s}X_{s2}^T(s,(X_{s3} - X_{s1}) - F_e - C_s(X_{s1}, X_{s2})X_{s2} - G_s(X_{s1})) + \frac{2k_m}{k_s}G_s(X_{s1})X_{s2}^T$$

$$+ X_{m2}^T \dot{M}_m(X_{m1})X_{m2} + \frac{k_m}{k_s}X_{s2}^T\dot{M}_s(X_{s1})X_{s2} + 2G_m(X_{m1})X_{m2}^T - 2X_{m2}^TF_h + 2\frac{k_m}{k_s}X_{s2}^TF_e$$

$$= -2k_m X_{m2}^T(X_{m1} - X_{s1}(t - T_s(t))) - 2\alpha_m X_{m2}^T X_{m2} + 2\frac{k_m}{k_s}X_{s2}^T S_s(X_{s3} - X_{s1})$$

$$= -2k_m X_{m2}^T(X_{m1} - X_{s1}(t - T_s(t))) - 2\alpha_m X_{m2}^T X_{m2} + 2\frac{k_m}{k_s}X_{s2}^T(S_s(X_{s3} - X_{s3}^*) + S_s X_{s3}^* - S_s X_{s1})$$

With Equation (5), the first virtual controller is derived as $X_{s3}^* = X_{s1} \pm S_s^{-1}(k_s(X_{m1}(t - T_m(t)) - X_{s1}) - \alpha_s X_{s2})$. By substituting the first virtual controller $X_{s3}^*$ into Equation (5), $$\dot{V}_{11} = -2k_m X_{m2}^T(X_{m1} - X_{s1}(t - T_s(t))) - 2\alpha_m X_{m2}^T X_{m2} \quad (6)$$

$$+ 2\frac{k_m}{k_s}X_{s2}^T(S_s(X_{s3} - X_{s3}^*) + k_s(X_{m1}(t - T_m(t)) - X_{s1}) - \alpha_s X_{s2})$$

$$= -2\alpha_m X_{m2}^T X_{m2} - 2\frac{k_m \alpha_s}{k_s}X_{s2}^T X_{s2} - 2k_m X_{m2}^T(X_{m1} - X_{s1}) - 2k_m X_{m2}^T(X_{s1} - X_{s1}(t - T_s(t)))$$

$$- 2k_m X_{s2}^T(X_{s1} - X_{m1}) - 2k_m X_{s2}^T(X_{m1} - X_{m1}(t - T_m(t))) + 2\frac{k_m}{k_s}X_{s2}^T S_s(X_{s3} - X_{s3}^*)$$

$$= -2\alpha_m X_{m2}^T X_{m2} - 2k_m(X_{m1} - X_{s1})^T(X_{m2} - X_{s2}) - 2\frac{k_m \alpha_s}{k_s}X_{s2}^T X_{s2} - 2k_m X_{m2}^T \int_{t-T_s(t)}^{t} X_{s2}(\xi)d\xi$$

$$- 2k_m X_{s2}^T \int_{t-T_m(t)}^{t} X_{m2}(\xi)d\xi + 2\frac{k_m}{k_s}X_{s2}^T S_s(X_{s3} - X_{s3}^*)$$

$$\dot{V}_{12} = 2k_m(X_{m2} - X_{s2})^T(X_{m1} - X_{s1})$$

$$\dot{V}_{13} = T_m X_{m2}^T Z X_{m2} - \int_{t-T_m}^{t} X_{m2}^T(\xi)Z X_{m2}(\xi)d\xi + T_s X_{s2}^T P X_{s2} - \int_{t-T_s}^{t} X_{s2}^T(\xi)P X_{s2}(\xi)d\xi$$

$$\leq \overline{T}_m X_{m2}^T Z X_{m2} - \int_{t-T_m(t)}^{t} X_{m2}^T(\xi)Z X_{m2}(\xi)d\xi + \overline{T}_s X_{s2}^T P X_{s2} - \int_{t-T_s(t)}^{t} X_{s2}^T(\xi)P X_{s2}(\xi)d\xi$$

is obtained. Furthermore, with the inequality, it holds that $$-2k_m X_{m2}^T \int_{t-T_s(t)}^{t} X_{s2}(\xi)d\xi - \int_{t-T_s(t)}^{t} X_{s2}^T(\xi)P X_{s2}(\xi)d\xi \leq \quad (7)$$

$$\overline{T}_s k_m^2 X_{m2}^T(t) P^{-1} X_{m2}(t)$$

$$-2k_m X_{s2}^T \int_{t-T_m(t)}^{t} X_{m2}(\xi)d\xi - \int_{t-T_m(t)}^{t} X_{m2}^T(\xi)Z X_{m2}(\xi)d\xi \leq$$

$$\overline{T}_m k_m^2 X_{s2}^T(t) Z^{-1} X_{s2}(t)$$

So $$\dot{V}_1 = \dot{V}_{11} + \dot{V}_{12} + \dot{V}_{13} \leq X_{m2}^T(-2\alpha_m I + \overline{T}_m Z + \overline{T}_s k_m^2 P^{-1})X_{m2} \quad (8)$$

$$+ X_{s2}^T\left(-2\frac{k_m \alpha_s}{k_s}I + \overline{T}_s P + \overline{T}_m k_m^2 Z^{-1}\right)X_{s2} + 2\frac{k_m}{k_s}X_{s2}^T S_s(X_{s3} - X_{s3}^*)$$

is derived, where I is the identity matrix, $z^{-1}$ and $P^{-1}$ are the inverse matrices of positive definite matrices Z and P, respectively. $S_s$ is a diagonal positive-definite constant matrix which contains the joint stiffness of the slave robot. $\alpha_m$ and $\alpha_s$ are damping coefficients which are positive constants. $k_m$, $k_s > 0$ are proportional coefficients. It is sup-posed that the time delay $T_m(t)$ and $T_s(t)$ are bounded, i.e. there are positive scalars $\overline{T}_m$ and $\overline{T}_s$, such that $T_m(t) \leq \overline{T}_m$, $T_s(t) \leq \overline{T}_s$, $X_{s3}^*$ is the first virtual controller.

The second Lyapunov Equation is selected as follows, $$V_2 = V_1 + \tfrac{1}{2}(X_{s3} - X_{s3}^*)^T(X_{s3} - X_{s3}^*) \quad (9)$$

The time derivative of $V_2$ is given by $$\dot{V}_2 = \dot{V}_1 + (X_{s3} - X_{s3}^*)^T(X_{s4} - \dot{X}_{s3}^*) = \dot{V}_1 + (X_{s3} - X_{s3}^*)^T(X_{s4} - X_{s4}^* + X_{s4}^* - \dot{X}_{s3}^*) \quad (10)$$

With equation (10), the second virtual controller is derived as $$X_{s4}^* = \dot{X}_{s3}^* - 2\frac{k_m}{k_s}S_s^T X_{s2} - k_1(X_{s3} - X_{s3}^*).$$

By substituting the second virtual controller $X_{s4}^*$ into Equation (10), $$\dot{V}_2 \leq X_{m2}^T(-2\alpha_m I + \overline{T}_m Z + \overline{T}_s k_m^2 P^{-1})X_{m2} + \quad (11)$$

$$X_{s2}^T\left(-2\frac{k_m \alpha_s}{k_s}I + \overline{T}_s P + \overline{T}_m k_m^2 Z^{-1}\right)X_{s2} +$$

$$(X_{s3} - X_{s3}^*)^T(X_{s4} - X_{s4}^*) - k_1(X_{s3} - X_{s3}^*)^T(X_{s3} - X_{s3}^*)$$

is derived.

The third Lyapunov Equation is selected as follows, $$V_3 = V_2 + \tfrac{1}{2}(X_{s4} - X^*_{s4})^T(X_{s4} - X^*_{s4}) \quad (12)$$

The time derivative of $V_3$ is given by $$\dot{V}_3 = \dot{V}_2 + (X_{s4} - X^*_{s4})^T(\dot{X}_{s4} - \dot{X}^*_{s4}) \quad (13)$$

$$= \dot{V}_2 + (X_{s4} - X^*_{s4})^T(J_s^{-1}(\tau_s - S_s(X_{s3} - X_{s1})) - \dot{X}^*_{s4})$$

The full-state feedback controller is derived from Equation (13) as $\tau_s = S_s(X_{s3} - X_{s1}) + J_s(\dot{X}^*_{s4} - (X_{s3} - X^*_{s3}) - k_2(X_{s4} - X^*_{s4}))$. By substituting the obtained all-state feedback controller $\tau_s$ into Equation (13), $$\dot{V}_3 \leq X_{m2}^T(-2\alpha_m I + T_m Z + T_s k_m^2 P^{-1}) X_{m2} +$$

$$X_{s2}^T\left(-2\frac{k_m \alpha_s}{k_s} I + T_s P + T_m k_m^2 Z^{-1}\right) X_{s2} -$$

$$k_1(X_{s3} - X^*_{s3})^T(X_{s3} - X^*_{s3}) - k_2(X_{s4} - X^*_{s4})^T(X_{s4} - X^*_{s4}) \quad (14)$$

is derived.

The controllers of the master-slave robot system with flexible joints are obtained by using the backstepping method as $$\tau_m = -k_m(X_{m1} - X_{s1}(t - T_s(t))) - \alpha_m X_{m2} \quad (15)$$

$$\tau_s = S_s(X_{s3} - X_{s1}) + J_s(\dot{X}^*_{s4} - (X_{s3} - X^*_{s3}) - k_2(X_{s4} - X^*_{s4}))$$

$$X^*_{s3} = X_{s1} + S_s^{-1}(k_s(X_{m1}(t - T_m(t)) - X_{s1}) - \alpha_s X_{s2})$$

$$X^*_{s4} = \dot{X}^*_{s3} - 2\frac{k_m}{k_s} S_s^T X_{s2} - k_1(X_{s3} - X^*_{s3})$$

where $\tau_m$ and $\tau_s$ are control torques provided by the controllers, $X^*_{s3}$ and $X^*_{s4}$ are the first virtual controller and the second virtual controller, respectively, $\dot{X}^*_{s3}$ and $\dot{X}^*_{s4}$ are the first derivatives of the virtual controllers $X^*_{s3}$ and $X^*_{s4}$, respectively, $T_m(t)$ and $T_s(t)$ are forward time delay (from the master robot to the slave robot) and backward time delay (from the slave robot to the master robot), respectively. $\alpha_m$ and $\alpha_s$ are damping coefficients which are positive constants. $k_m, k_s > 0$ are proportional coefficients. $S_s^{-1}$ and $S_s^T$ are the inverse matrix and the transpose matrix of a diagonal positive-definite constant matrix $S_s$ which contains the joint stiffness of the slave robot, respectively. $J_s$ is the diagonal constant matrix of the moments of actuator inertia. $k_1$ and $k_2$ are selected to be positive constants.

Step 3: designing high-dimensional uniform accurate differentiators to carry out a precise difference to the first virtual controller and the second virtual controller.

Letting $X_1 = X^*_{s3}$, $X_2 = \dot{X}^*_{s3}$, $\sigma_1 = X_1 - Y_1$, $\sigma_2 = X_2 - Y_2$, $$\begin{cases} \dot{X}_1 = X_2 \\ \dot{X}_2 = \ddot{X}^*_{s3} \end{cases} \quad (16)$$

$$\begin{cases} \dot{Y}_1 = \lambda_1 \frac{\sigma_1}{\|\sigma_1\|^{1/2}} + \lambda_2 \sigma_1 \|\sigma_1\|^{P-1} + Y_2 \\ \dot{Y}_2 = \alpha_1 \frac{\sigma_1}{\|\sigma_1\|} \end{cases} \quad (17)$$

with Equations (16) and (17), $$\begin{cases} \dot{\sigma}_1 = -\lambda_1 \frac{\sigma_1}{\|\sigma_1\|^{1/2}} - \lambda_2 \sigma_1 \|\sigma_1\|^{P-1} + \sigma_2 \\ \dot{\sigma}_2 = -\alpha_1 \frac{\sigma_1}{\|\sigma_1\|} + \ddot{X}^*_{s3} \end{cases} \quad (18)$$

is derived, where $X^*_{s3}$ denotes the first virtual controller, $\dot{X}^*_{s3}$ denotes the first derivative of the first virtual controller $X^*_{s3}$, $\ddot{X}^*_{s3}$ denotes the second derivative of the first virtual controller $X^*_{s3}$, $Y_1$ is an estimate of the first virtual controller $X^*_{s3}$, $Y_2$ is an estimate of $\dot{X}^*_{s3}$, $\sigma_1$ and $\sigma_2$ are estimation errors, $\lambda_1, \lambda_2, \alpha_1 > 0$ are system control gains, $P > 1$ is a constant, $\ddot{X}^*_{s3}$ is supposed to be bounded and satisfies $\|\ddot{X}^*_{s3}\| \leq L_3$ with a known constant $L_3 > 0$. If the parameters are selected to satisfy the conditions $\alpha_1 > 4L_3$, $\lambda_1 > \sqrt{2\alpha_1}$, the estimation errors $\sigma_1, \sigma_2$ will converge to the origin quickly, thus a precise difference value $\dot{X}^*_{s3}$ of $X^*_{s3}$ is obtained.

Letting $X_3 = X^*_{s4}$, $X_4 = \dot{X}^*_{s4}$, $\sigma_3 = X_3 - Y_3$, $\sigma_4 = X_4 - Y_4$, $$\begin{cases} \dot{X}_3 = X_4 \\ \dot{X}_4 = \ddot{X}^*_{s4} \end{cases} \quad (19)$$

$$\begin{cases} \dot{Y}_3 = \lambda_3 \frac{\sigma_3}{\|\sigma_3\|^{1/2}} + \lambda_4 \sigma_3 \|\sigma_3\|^{P-1} + Y_4 \\ \dot{Y}_4 = \alpha_2 \frac{\sigma_3}{\|\sigma_3\|} \end{cases} \quad (20)$$

with Equations (19) and (20), $$\begin{cases} \dot{\sigma}_3 = -\lambda_3 \frac{\sigma_3}{\|\sigma_3\|^{1/2}} - \lambda_4 \sigma_3 \|\sigma_3\|^{P-1} + \sigma_4 \\ \dot{\sigma}_4 = -\alpha_2 \frac{\sigma_3}{\|\sigma_3\|} + \ddot{X}^*_{s4} \end{cases} \quad (21)$$

is derived, where $X^*_{s4}$ denotes the second virtual controller, $\dot{X}^*_{s4}$ denotes the first derivative of the second virtual controller $X^*_{s4}$, $\ddot{X}^*_{s4}$ denotes the second derivative of the second virtual controller $X^*_{s4}$, $Y_3$ is an estimate of the second virtual controller $X^*_{s4}$, $Y_4$ is an estimate of $\dot{X}^*_{s4}$, $\sigma_3$ and $\sigma_4$ are estimation errors, $\lambda_3, \lambda_4, \alpha_2 > 0$ are system control gains, $\ddot{X}^*_{s4}$ is supposed to be bounded and satisfies $\|\ddot{X}^*_{s4}\| \leq L_4$ with a known positive constant $L_4 > 0$. If the parameters are selected to satisfy the conditions $\alpha_2 > 4L_4$, $\lambda_3 > \sqrt{2\alpha_2}$, the estimation errors $\sigma_3, \sigma_4$ will converge to the origin quickly, thus a precise difference value $\dot{X}^*_{s4}$ of $X^*_{s4}$ is obtained.

Step 4: Establishing the delay-dependent system stability criteria by constructing Lyapunov Equations, providing the criteria for selecting controller parameters, and realizing the global stability of the master-slave robot system with flexible joints and time-varying delays.

The Lyapunov Equation is selected as $$V_{11} = X_{m2}^T M_m(X_{m1}) X_{m2} + \frac{k_m}{k_s} X_{s2}^T M_s(X_{s1}) X_{s2} + \quad (22)$$

$$2(U_m(X_{m1}) - \beta_m) + \frac{2k_m}{k_s}(U_s(X_{s1}) - \beta_s) +$$

$$2\int_0^t \left(-X_{m2}^T(\sigma) F_h(\sigma) + \frac{k_m}{k_s} X_{s2}^T(\sigma) F_e(\sigma)\right) d\sigma$$

$$V_{12} = k_m(X_{m1} - X_{s1})^T(X_{m1} - X_{s1})$$

-continued $$V_{13} = \int_{-T_m}^{0}\int_{t+\theta}^{t} X_{m2}^T(\xi)ZX_{m2}(\xi)d\xi d\theta + \int_{-T_s}^{0}\int_{t+\theta}^{t} X_{s2}^T(\xi)PX_{s2}(\xi)d\xi d\theta$$

$$V_1 = V_{11} + V_{12} + V_{13}$$

$$V_2 = V_1 + \frac{1}{2}(X_{s3} - X_{s3}^*)^T(X_{s3} - X_{s3}^*)$$

$$V_3 = V_2 + \frac{1}{2}(X_{s4} - X_{s4}^*)^T(X_{s4} - X_{s4}^*)$$

The time derivative of $V_3$ is given by $$\dot{V}_3 \le X_{m2}^T(-2\alpha_m I + \overline{T}_m Z + \overline{T}_s k_m^2 P^{-1})X_{m2} + \quad (23)$$

$$X_{s2}^T\left(-2\frac{k_m \alpha_s}{k_s}I + \overline{T}_s P + \overline{T}_m k_m^2 Z^{-1}\right)X_{s2}$$

$$- k_1(X_{s3} - X_{s3}^*)^T(X_{s3} - X_{s3}^*) - k_2(X_{s4} - X_{s4}^*)^T(X_{s4} - X_{s4}^*)$$

When the controller parameters $\alpha_m$, $\alpha_s$, $k_m$, $k_s$, I, $\overline{T}_m$, $\overline{T}_s$, Z, P are selected such that the following conditions hold, $$-2\alpha_m I + \overline{T}_m Z + \overline{T}_s k_m^2 P^{-1} < 0,\ -2\frac{k_m \alpha_s}{k_s}I + \overline{T}_s P + \overline{T}_m k_m^2 Z^{-1} < 0$$

the joint and motor velocities $\dot{q}_m$, $\dot{q}_s$, $\dot{\theta}_s$ and position error $q_m - q_s$ of the master-slave robot system with flexible joints are all bounded.

If the force $F_h$ exerted by an operator to the master robot and a force $F_e$ exerted by the external environment to the slave robot are both zero, the controllers are designed as follows:

$$\tau_m = -k_m(X_{m1} - X_{s1}(t - T_s(t))) - \alpha_m X_{m2} + G_m(X_{m1}) \quad (24)$$

$$\tau_s = S_s(X_{s3} - X_{s1}) + J_s(\dot{X}_{s4}^* - (X_{s3} - X_{s3}^*) - k_2(X_{s4} - X_{s4}^*))$$

$$X_{s3}^* = X_{s1} + S_s^{-1}(k_s(X_{m1}(t - T_m(t)) - X_{s1}) - \alpha_s X_{s2} + G_s(X_{s1}))$$

$$X_{s4}^* = \dot{X}_{s3}^* - 2\frac{k_m}{k_s}S_s^T X_{s2} - k_1(X_{s3} - X_{s3}^*)$$

where $X_{s3}^*$ and $X_{s4}^*$ are the first controller and the second virtual controller, respectively, $\dot{X}_{s3}^*$ and $\dot{X}_{s4}^*$ are the first derivatives of the virtual controllers $X_{s3}^*$ and $X_{s4}^*$, respectively, $T_m(t)$ and $T_s(t)$ are forward time delay (from the master robot to the slave robot) and backward time delay (from the slave robot to the master robot), respectively, $\alpha_m$ and $\alpha_s$ are damping coefficients which are positive constants, $k_m$, $k_s > 0$ are proportional coefficients, $S_s^{-1}$ and $S_s^T$ are the inverse matrix and the transpose matrix of a diagonal positive-definite constant matrix $S_s$ which contains the joint stiffness of the slave robot, respectively, $G_m(X_{m1})$, $G_s(X_{s1})$ are the gravity torques of the master robot and the slave robot, $J_s$ is a diagonal constant matrix of the moment of actuator inertia, and $k_1$ and $k_2$ are selected to be positive constants.

When the controller parameters $\alpha_m$, $\alpha_s$, $k_m$, $k_s$, I, $\overline{T}_m$, $\overline{T}_s$, Z, P are selected such that the following conditions hold, $$-2\alpha_m I + \overline{T}_m Z + \overline{T}_s k_m^2 P^{-1} < 0,\ -2\frac{k_m \alpha_s}{k_s}I + \overline{T}_s P + \overline{T}_m k_m^2 Z^{-1} < 0$$

it can be guaranteed that the joint and motor velocities $\dot{q}_m$, $\dot{q}_s$, $\dot{\theta}_s$ and the position error $q_m - q_s$ of the master-slave robot system with flexible joints will converge to zero asymptotically and that the global master-slave robot system with flexible joints will asymptotically become stable.

For a master-slave robot system with flexible joints, first a control command is sent by the operator to the master robot, and the master robot is controlled by the proportional damping controller $\tau_m$ and transmits the received control command to the slave robot through the network information transmission channel. Then the slave robot controlled by the full-state feedback controller $\tau_s$ executes the control command on the external environment, feedbacks the measured position and force information to the operator in time, thus a closed-loop system is formed and tasks can be completed effectively.

Based on the backstepping technique and the high-dimension uniform accurate differentiators, a full-state feedback controller is proposed for a flexible master-slave robot system. With this flexible master-slave robot system, accurate position tracking performance is achieved in the global scope. Additionally, the global asymptotic convergence is guaranteed and the robustness of the closed-loop master-slave system is improved.

The above-mentioned embodiment merely describes the preferred embodiment of the present invention. The scope of the invention should not be limited by the described embodiment. It is intended that various changes and modifications to the technical solutions of the present invention made by those skilled in the art without departing from the spirit of the present invention shall fall within the protection scope determined by the claims of the present invention.

What is claimed is:

1. A full-state control method for a master-slave robot system with flexible joints and time-varying delays, comprising:

connecting a master robot and a slave robot through a network to form a teleoperation system;

measuring system parameters of the master robot and the slave robot, and measuring position and velocity information of joints and motors of the master robot and the slave robot in real-time;

controlling the master robot with a proportional damping controller and controlling the slave robot with a full-state feedback controller, wherein a control torque provided by the proportional damping controller and a control torque provided by the full-state feedback controller are determined according to following formulas:

$$\tau_m = -k_m(X_{m1} - X_{s1}(t - T_s(t))) - \alpha_m X_{m2}$$

$$\tau_s = S_s(X_{s3} - X_{s1}) + J_s(\dot{X}_{s4}^* - (X_{s3} - X_{s3}^*) - k_2(X_{s4} - X_{s4}^*)),$$

wherein, $\tau_m$ is the control torque provided by the proportional damping controller and $\tau_s$ is the control torque provided by the full-state feedback controller, $X_{s3}^*$ is a first virtual controller and $X_{s4}^*$ is a second virtual controller, $\dot{X}_{s4}^*$ is a first derivative of $X_{s4}^*$, $X_{m1}$ is a vector of joint displacements of the master robot, $X_{m2}$ is a vector of joint velocities of the master robot, $X_{s1}$ is a vector of joint displacement of the slave robot, $X_{s3}$ is a vector of motor positions of the slave robot, $X_{s4}$ is a vector of motor velocities of the slave robot, $T_s(t)$ is a feedback time delay from the slave robot to the master robot, $\alpha_m$ is a damping coefficient which is a positive constant, $k_m$ is >0 a proportional coefficient, $S_s$ is a diagonal positive-definite constant matrix which contains a joint stiffness of the slave robot, $J_s$ is a diagonal constant matrix of a moment of actuator inertia, and $k_2$ is selected to be a positive constant.

2. The full-state control method of the master-slave robot system with flexible joints and time-varying delays according to claim 1, wherein the system parameters of the master robot and the slave robot comprises: length and mass of manipulators of the master robot and the slave robot, positions and positive-definite inertia matrices $M_m(X_{m1})$ and $M_s(X_{s1})$ matrices of centripetal and coriolis torques $C_m(q_m, \dot{q}_m)$ and $C_s(q_s, \dot{q}_s)$ gravity torques $G_m(X_{m1})$ and $G_s(X_{s1})$, diagonal constant matrix $J_s$ of moment of actuator inertia of the master robot and the slave robot, and a diagonal positive-definite constant matrix $S_s$ that contains joint stiffness of the slave robot.

3. The full-state control method of the master-slave robot system with flexible joints and time-varying delays according to claim 2, wherein the first virtual controller $X^*_{s3}$ and the second virtual controller $X^*_{s4}$ are determined according to following formulas:

$$X^*_{s3} = X_{s1} + S_s^{-1}(k_s(X_{m1}(t - T_m(t)) - X_{s1}) - \alpha_s X_{s2}),$$

$$X^*_{s4} = \dot{X}^*_{s3} - 2\frac{k_m}{k_s}S_s^T X_{s2} - k_1(X_{s3} - X^*_{s3}),$$

wherein, subscripts m and s denotes the master robot and the slave robot, respectively; $\dot{X}^*_{s3}$ is a first derivative of $X^*_{s3}$, $X_{s2}$ is a vector of joint velocities of the slave robot, $T_m(t)$ denotes a forward time delay from the master robot to the slave robot, $\alpha_s$ is a damping coefficient which is a positive constant, $k_m$, $k_s$>0 are proportional coefficients, $S_s^{-1}$ and $S_s^T$ are an inverse matrix and a transpose matrix of the diagonal positive-definite constant matrix $S_s$, respectively, and $k_1$ is selected to be a positive constant.

4. The full-state control method of the master-slave robot system with flexible joints and time-varying delays according to claim 3, wherein $\dot{X}^*_{s3}$ is determined according to following formulas:

$$X_1 = X^*_{s3}, X_2 = \dot{X}^*_{s3}, \sigma_1 = X_1 - Y_1, \sigma_2 = X_2 - Y_2,$$

$$\begin{cases} \dot{X}_1 = X_2 \\ \dot{X}_2 = \ddot{X}^*_{s3} \end{cases} \quad (1)$$

$$\begin{cases} \dot{Y}_1 = \lambda_1 \frac{\sigma_1}{\|\sigma_1\|^{1/2}} + \lambda_2 \sigma_1 \|\sigma_1\|^{P-1} + Y_2 \\ \dot{Y}_2 = \alpha_1 \frac{\sigma_1}{\|\sigma_1\|} \end{cases} \quad (2)$$

$$\begin{cases} \dot{\sigma}_1 = -\lambda_1 \frac{\sigma_1}{\|\sigma_1\|^{1/2}} - \lambda_2 \sigma_1 \|\sigma_1\|^{P-1} + \sigma_2 \\ \dot{\sigma}_2 = -\alpha_1 \frac{\sigma_1}{\|\sigma_1\|} + \ddot{X}^*_{s3} \end{cases} \quad (3)$$

wherein, $\ddot{X}^*_{s3}$ denotes a second derivative of $X^*_{s3}$, $Y_1$ is an estimate of $X^*_{s3}$, $Y_2$ is an estimate of $\dot{X}^*_{s3}$, $\sigma_1$ and $\sigma_2$ are estimation errors, $\lambda_1, \lambda_2, \alpha_1$>0 are system control gains, P>1 is a constant, $\ddot{X}^*_{s3}$ is supposed to be bounded and satisfies $\|\ddot{X}^*_{s3}\| \leq L_3$ with a known constant $L_3$>0, and conditions $\alpha_1 > 4L_3$, $\lambda_1 > \sqrt{2\alpha_1}$ are satisfied.

5. The full-state control method of the master-slave robot system with flexible joints and time-varying delays according to claim 3, wherein $\dot{X}^*_{s4}$ is determined according to following formulas:

$$X_3 = X^*_{s4}, X_4 = \dot{X}^*_{s4}, \sigma_3 = X_3 - Y_3, \sigma_4 = X_4 - Y_4,$$

$$\begin{cases} \dot{X}_3 = X_4 \\ \dot{X}_4 = \ddot{X}^*_{s4} \end{cases} \quad (4)$$

$$\begin{cases} \dot{Y}_3 = \lambda_3 \frac{\sigma_3}{\|\sigma_3\|^{1/2}} + \lambda_4 \sigma_3 \|\sigma_3\|^{P-1} + Y_4 \\ \dot{Y}_4 = \alpha_2 \frac{\sigma_3}{\|\sigma_3\|} \end{cases} \quad (5)$$

$$\begin{cases} \dot{\sigma}_3 = -\lambda_3 \frac{\sigma_3}{\|\sigma_3\|^{1/2}} - \lambda_4 \sigma_3 \|\sigma_3\|^{P-1} + \sigma_4 \\ \dot{\sigma}_4 = -\alpha_2 \frac{\sigma_3}{\|\sigma_3\|} + \ddot{X}^*_{s4} \end{cases} \quad (6)$$

wherein, $\ddot{X}^*_{s4}$ is a second derivative of $X^*_{s4}$, $Y_3$ is an estimate of $X^*_{s4}$, $Y_4$ is an estimate of $\dot{X}^*_{s4}$, $\sigma_3$ and $\sigma_4$ are estimation errors, $\lambda_3, \lambda_4, \alpha_2$>0 are system control gains, $\ddot{X}^*_{s4}$ is supposed to be bounded and satisfies $\|\ddot{X}^*_{s4}\| \leq L_4$ with a known positive constant $L_4$>0, and conditions $\alpha_2 > 4L_4$, $\lambda_3 > \sqrt{2\alpha_2}$ are satisfied.

6. The full-state control method of the master-slave robot system with flexible joints and time-varying delays according to claim 3, wherein parameters $\alpha_m, \alpha_s, k_m, k_s, I, T_m, T_s, Z, P$ of the controllers are selected such that the following inequalities hold, $$-2\alpha_m I + \overline{T}_m Z + \overline{T}_s k_m^2 P^{-1} < 0, \quad -2\frac{k_m \alpha_s}{k_s} I + \overline{T}_s P + \overline{T}_m k_m^2 Z^{-1} < 0,$$

wherein, I is an identity matrix, $Z^{-1}$ and $P^{-1}$ are inverse matrices of positive definite matrices Z and P, respectively, and the time delay $T_m(t)$ and $T_s(t)$ are bounded, i.e. there are positive scalars $\overline{T}_m$ and $\overline{T}_s$, such that the inequalities $T_m(t) \leq \overline{T}_m$, $T_s(t) \leq \overline{T}_s$ hold.

* * * * *